May 14, 1935. H. W. KLEIST 2,001,199
REFRIGERATOR
Filed Oct. 12, 1931
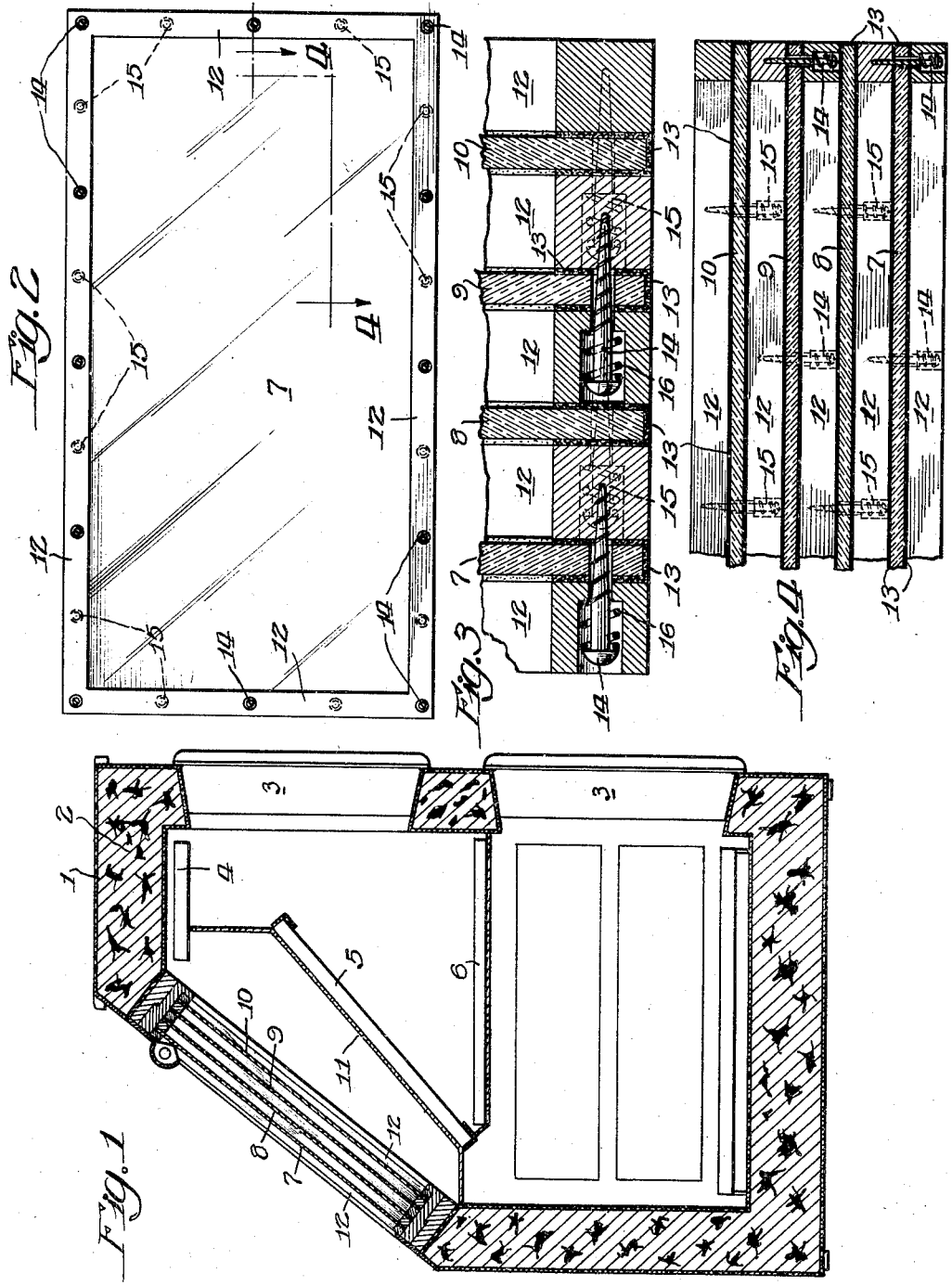
Inventor:
Herman W. Kleist
By Parker & Curtis Attys Patented May 14, 1935

2,001,199

UNITED STATES PATENT OFFICE 2,001,199

REFRIGERATOR

Herman W. Kleist, Chicago, Ill., assignor to Dole Refrigerating Machine Company, Chicago, Ill., a corporation of Illinois Application October 12, 1931, Serial No. 568,221

4 Claims. (Cl. 20—56.5)

This invention relates to refrigerators and has for its object to provide a new and improved device of this description.

The invention is particularly adapted to be used in connection with refrigerators for the purpose of displaying cooled products, such as food products, the products being kept in a cooled condition but being visible from the exterior of the refrigerator. In such devices great difficulty has been met with in keeping the glass portions of the refrigerator clear so that the vision will not be destroyed. In such devices it has been found necessary, in order to maintain the temperature in the refrigerator, to provide, at the place where the food is observed, a plurality of glasses arranged in parallel relation with air spaces between them. It has also been found that moisture gets in between these glasses and deposits either as frost or as moisture on the surfaces of the glass, thereby obscuring or obstructing the vision. This is particularly true when the refrigerators are allowed to warm up and are then again cooled. Under such conditions if an air tight connection is made at the edges of the glasses the contraction and expansion cracks the glasses, thereby permitting air to enter.

One of the objects of the present invention is to provide a refrigerator which will be free from the obstructing effect on the glasses of moisture between the glasses. In the prior construction when any interior glass was injured or became obscured, it was necessary to take out the entire glass section.

My invention has as a further object to provide a construction where any individual glass can be separately removed and replaced. The invention has as a further object to provide a glass section for refrigerators that automatically takes care of expansion and contraction of the parts. The invention has other objects which are more particularly pointed out in the accompanying description.

Referring now to the drawing, Fig. 1 is a sectional view through one form of refrigerator embodying the invention, intermediate the adjusting screws;

Fig. 2 is a front view of the glass section;

Fig. 3 is an enlarged sectional view through one end of the glass section showing the connection of the glasses to their supports;

Fig. 4 is a sectional view taken on line 4—4 of Fig. 2.

Like numerals refer to like parts throughout the several figures.

Referring now to the drawing I have shown one form of refrigerator comprising a casing 1 having an insulating lining 2. This casing has doors 3 for access thereto. Any suitable means is provided for cooling the interior of the refrigerator. As herein shown the cooling is done by the refrigerating plates 4, 5 and 6 through which a refrigerant is circulated. An observation section is provided, consisting of a plurality of glasses 7, 8, 9 and 10 and the cooled products are observed through these glasses and may be arranged in the refrigerator in any desired manner, as for example on the display space 11.

The glasses are arranged so as to have an air tight connection at their edges all the way around with their supports, and this connection is arranged so that it automatically takes care of the expansion and contraction, thereby preventing the expansion and contraction from injuring the glass or other parts, or from injuring or destroying the air tight connection between the glasses and their supports.

In the particular construction shown supporting members 12 are provided extending entirely around the glasses, as shown in Fig. 2. Fig. 3 shows one method of connecting the glasses with the supporting members. In this construction there are associated with the edges of each glass a suitable gasket member 13 which forms a tight seal. Pressure is applied to the edges of the glasses at the sealing points in some suitable manner, and this pressure is elastic so that it will give properly and automatically adjust itself to the contraction and expansion of the parts. In the construction shown this pressure is produced by means of fastening devices, such as screws 14 and 15 which pass through holes in the glass and which are screwed into the adjacent supporting member. Each supporting member has an enlarged opening for the head of the screw and an elastic device, such as the spring 16, is placed so that when the screw is tightened up the spring elastically presses one frame member toward the other so as to elastically clamp the edge of the glass in position. The fastening devices 14 and 15 for the adjacent glasses are staggered as shown, that is they are out of alignment so that they will not interfere with each other. It will thus be seen that as each glass is pressed between its supporting members the screws will be tightened up the desired amount and the springs 16 compressed, and that the supporting members and the gaskets will be elastically pressed toward the glasses so as to form an air tight joint, and at the same time automatically permit the contraction and expansion due to the variations in temperature.

This construction, therefore, prevents moisture from entering between the glasses so as to obstruct the vision because of the deposit of moisture or frost on the glasses.

It will further be seen that any glass can be separately removed and a new glass placed in position if it becomes desirable.

It will further be seen that the glass with the associated frame may be made as a separate part and then attached to the refrigerator, thus permitting it to be used with any refrigerator by simply making it the proper size. It will further be seen that this construction takes up the expansion and contraction of the frame, not only between the glass, but between the frame and other parts.

I claim:

1. A refrigerator comprising an insulated casing, an observation section associated therewith comprising a plurality of glasses arranged side by side and separated from each other, supporting members for said glasses, means for compressing the edges of the glasses between said supporting members to form air tight joints, and means associated with said supporting members but separate therefrom for automatically adjusting them to compensate for expansion and contraction of the glasses due to variations in temperature.

2. A refrigerator comprising an insulated casing, an observation section associated therewith comprising a plurality of glasses arranged side by side and separated from each other, supporting members for said glasses, threaded fastening devices connecting the adjacent supporting members by means of which the edges of the glasses are compressed between the supporting members, and elastic devices associated with said threaded fastening devices and through which pressure is applied to the supporting members.

3. A refrigerator comprising an insulated casing, an observation section associated therewith comprising a plurality of glasses arranged side by side, a frame therefor comprising rigid parts projecting between the edges of the glasses, compressible sealing pieces between the glasses and said rigid parts, and elastic means for pressing the rigid parts toward the glasses to compress said compressible sealing pieces to form air tight joints.

4. A glass member for refrigerators comprising a plurality of pieces of glass, a frame having rigid supporting parts projecting between the pieces of glass, extending entirely therearound, supporting members movably mounted in said frame between said glasses and engaging the edges thereof, and means including said supporting member for elastically pressing the edges of said glass against said rigid supporting parts all around said frame so as to form an air tight construction.

HERMAN W. KLEIST.